(12) United States Patent
McCabe (10) Patent No.: US 10,065,182 B2
(45) Date of Patent: Sep. 4, 2018

(54) METHOD OF WATER PURIFICATION

(71) Applicant: UNIVERSITY OF CENTRAL LANCASHIRE, Preston Lancashire (GB)

(72) Inventor: Richard Walter McCabe, Preston (GB)

(73) Assignee: UNIVERSITY OF CENTRAL LANCASHIRE, Lancashire (GB)

( * ) Notice: Subject to any disclaimer, the term of this patent is extended or adjusted under 35 U.S.C. 154(b) by 166 days.

(21) Appl. No.: 14/780,372

(22) PCT Filed: Mar. 24, 2014

(86) PCT No.: PCT/GB2014/050919
§ 371 (c)(1),
(2) Date: Sep. 25, 2015

(87) PCT Pub. No.: WO2014/155077
PCT Pub. Date: Oct. 2, 2014

(65) Prior Publication Data
US 2016/0051975 A1 Feb. 25, 2016

(30) Foreign Application Priority Data

Mar. 26, 2013 (GB) .................................. 1305514.0

(51) Int. Cl.
*B01J 23/00* (2006.01)
*B01J 35/00* (2006.01)
(Continued)

(52) U.S. Cl.
CPC .............. *B01J 35/004* (2013.01); *B01J 21/16* (2013.01); *B01J 23/745* (2013.01); *B01J 29/049* (2013.01);
(Continued)

(58) Field of Classification Search
CPC ........ B01J 35/004; B01J 37/08; B01J 23/745; B01J 29/049; B01J 37/30; B01J 21/16;
(Continued)

(56) References Cited

U.S. PATENT DOCUMENTS

2006/0076299 A1    4/2006  Feng et al.
2010/0148135 A1*  6/2010  Yokoyama ........... C01G 23/047
                                                     252/589

FOREIGN PATENT DOCUMENTS

WO    2006070384    7/2006
WO    2014155077    10/2014

OTHER PUBLICATIONS

Kong et al. "reatment of petroleum-contaminated soils using iron mineral catalyzed hydrogen peroxide" Chemosphere vol. 37, Issue 8, Oct. 1998, pp. 1473-1482, Oct. 21, 1998.*
(Continued)

*Primary Examiner* — Haytham Soliman
(74) *Attorney, Agent, or Firm* — Barnes & Thornburg LLP (57) ABSTRACT

The present invention relates to a water-purifying composite material, especially a water-purifying composite material for use in the photocatalytic destruction of pollutants in water. The water-purifying composite materials of the invention are uniquely formed by growing crystals of photocatalytic metal compounds in situ within interlayer regions or pores within an aluminosilcate mineral structure, to thereby provide highly catalytic species for use in oxidative photocatalytic water treatments.

13 Claims, 3 Drawing Sheets

(51) Int. Cl.
| | |
|---|---|
| *B01J 37/08* | (2006.01) |
| *B01J 37/30* | (2006.01) |
| *B01J 21/16* | (2006.01) |
| *B01J 23/745* | (2006.01) |
| *B01J 29/04* | (2006.01) |
| *C02F 9/00* | (2006.01) |
| *C02F 1/28* | (2006.01) |
| *C02F 1/32* | (2006.01) |
| *C02F 1/72* | (2006.01) |

(52) U.S. Cl.
CPC ............... *B01J 37/08* (2013.01); *B01J 37/30* (2013.01); *C02F 9/00* (2013.01); *C02F 1/281* (2013.01); *C02F 1/288* (2013.01); *C02F 1/32* (2013.01); *C02F 1/722* (2013.01); *C02F 1/727* (2013.01); *C02F 2209/001* (2013.01); *C02F 2209/44* (2013.01); *C02F 2305/10* (2013.01)

(58) Field of Classification Search
CPC ........ C02F 9/00; C02F 2209/44; C02F 1/288; C02F 1/32; C02F 1/722; C02F 1/727; C02F 2209/001; C02F 1/281; C02F 2305/10
USPC ......................................................... 502/325
See application file for complete search history.

(56) References Cited

OTHER PUBLICATIONS

Feng et al. "Novel Bentonite Clay-Based Fe-Nanocomposite as a Heterogeneous Catalyst for Photo-Fenton Discoloration and Mineralization of Orange II" Environ. Sci. Technol., 2004, 38 (1), pp. 269-275, Nov. 13, 2003.*
International Search Report, International Application No. PCT/GB2014/050919, dated 2014, 4 pages.
Cheng et al, Catalytic activity of iron species in layered clays for photodegradation of organic dyes under visible irradiation, Applied Catalysis B: Environmental, Elsevier, Amsterdam, NL, vol. 77, No. 3-4, 2007, pp. 355-363.
Chen et al: Heterogeneous UV-Fenton catalytic degradation of dyestuff in water with hydroxyl-Fe pillared bentonite, Catalysis Today, Elsevier, NL, vol. 126, No. 3-4, 2007, pp. 463-470.
Iurascu B et al: Phenol degradation in water through a heterogeneous photo-Fenton process catalyzed by Fe-treated laponite, Water Research, Elsevier, Amsterdam, NL, vol. 43, No. 5, 2009, pp. 1313-1322.
Luis Ferney Gonzlez-Bahamn et al: New Fe-immobilized natural bentonite plate used as photo-Fenton catalyst for organic pollutant degradation, Chemosphere, Pergamon Press, Oxford, GB, vol. 82, No. 8, 2010, pp. 1185-1189.
Jing Guo et al: Catalytic Wet Oxidation of Phenol by Hydragen Peroxide over Pillared Clay Catalyst, Industrial & Engineering Chemistry Research, vol. 42, No. 12, 2003, pp. 2450-2460.
Joel Barrault et al: Catalytic wet peroxide oxidation of phenol overpillared clays containing iron or copper species MÉ Moire Court/ Short Paper, Chimie/ Chemistry, 2000, pp. 777-783.
Kurian M et al: Wet peroxide oxidation of phenol over mixed pillared montmorillonites, Chemical Engineering Journal, Elsevier Sequoia, Lausanne, CH, vol. 155, No. 3, 2006, pp. 139-146.
Nancy R. Sanabria et al: Development of Pillared Clays for Wet Hydrogen Peroxide Oxidationof Phenol and Its Application in the Posttreatment of Coffee Wastewater, International Journal of Photoenergy, vol. 16, No. 3, 2012, pp. 144-17.
J Barrault et al: Catalytic wet peroxide oxidation over mixed (Al—Fe) pillared clays, Applied Catalysis. B, Environmental, vol. 27, No. 4, 2000, pp. 225-230.
Kakuta, Seiji; "Photocatalysis for water oxidation by Fe2O3 nanoparticles embedded in clay compound: correlation between its polymorphs and their photocatalytic activities", Journal of Materials Science, Springer Science Business Media, 2009, pp. 2890-2898, vol. 44 Issue 11.
Han, Zhaohui et al; "Nanocomposites of layered clays and cadmium sulfide: Similarities and differences in formation, structure and properties" Microporous and Mesoporous Materials 108, 2008, pp. 168-182.
De Leon et al; "Catalytic activity of an iron-pillared montmorillonitic clay mineral in heterogeneous photo-Fenton process" Catalysis Today 133-135, 2008, pp. 600-605.
Feng et al; "Novel Bentonite Clay-Based Fe-Nanocomposite as a Heterogeneous Catalyst for Photo-Fenton Discoloration and Mineralization of Orange II" Department of Chemical Engineering, Hong Kong University of Science and Technology, Environ. Sci. Technol 2004, 38, pp. 269-275.

* cited by examiner

METHOD OF WATER PURIFICATION

CROSS-REFERENCE TO RELATED APPLICATIONS

This application is a national stage entry under 35 USC § 371(b) of PCT International Application No. PCT/GB2014/050919, filed Mar. 24, 2014, and claims the benefit of United Kingdom Patent Application No. 1305514.0, filed on Mar. 26, 2013, both of which are expressly incorporated by reference herein.

INTRODUCTION

The present invention relates to a water-purifying composite material, especially a water-purifying composite material for use in the photocatalytic destruction of pollutants in water. The invention also relates to a method of preparing a water-purifying composite material, a water treatment device, a method of water purification/water treatment, a post-treated water product, a method of regenerating a used water-purifying composite material, and a method of increasing the water-purifying activity of a water-purifying composite.

BACKGROUND

Many industrial processes (e.g. olive oil production) produce water soluble organic pollutants including phenols. These need removing before the water can be actually discharged. In the treatment of water contaminated with organic pollutants, mineralisation is the ideal; basically this entails breaking up an organic pollutant, for example phenol: the destruction of the molecule yielding carbon dioxide & water.

Technologies use adsorption and filtration methods to counteract the release of such pollutants[1]. However, from an economic viewpoint, adsorption technologies usually require the use of activated carbons which are expensive to produce and regenerate.

An object of the present invention is to provide a relatively inexpensive water-purifying composite material, and relatively inexpensive process of purifying water using said composite material.

Another object of the present invention is to provide a relatively simple method of preparation of a water-purifying composite material, and relatively simple process of purifying water using said composite material.

Another object is to provide a water-purifying composite material and method of use that is relatively environmentally benign.

Another object is to provide a water-purifying composite material that may be used as a heterogeneous catalyst to purify water, to thereby enable simple removal thereof following use.

Another object is to provide a water-purifying composite material whose catalytic species do not leach but are yet still highly catalytic and durable.

Another object is to provide a water-purifying composite material that is relatively absorbent of pollutants.

BRIEF SUMMARY OF THE DISCLOSURE

According to a first aspect of the present invention, there is provided a method of preparing a water-purifying composite material, the method comprising:

(i) providing a pre-transformed composite material comprising or consisting of an aluminosilicate mineral material comprising a non-crystalline pre-active metal species;
(ii) transforming the pre-active metal species into a crystalline photocatalytic metal compound immobilized within the aluminosilicate mineral material;
wherein the photocatalytic metal compound absorbs electromagnetic radiation within the visible spectrum.

According to a second aspect of the present invention, there is provided a water-purifying composite material obtainable by, obtained by, or directly obtained by the method of the first aspect.

According to a third aspect of the present invention, there is provided a water-purifying composite material, comprising:
an aluminosilicate mineral material; and
a crystalline photocatalytic metal compound immobilized within the aluminosilicate mineral material;
wherein the photocatalytic metal compound absorbs electromagnetic radiation within the visible spectrum.

According to a fourth aspect of the present invention, there is provided a water treatment device comprising a water-purifying composite material as defined in the second or third aspects.

According to a fifth aspect of the present invention, there is provided a method of water purification, comprising:
(i) contacting water, containing or suspected to contain one or more pollutants, with a water-purifying composite material as defined in either of the second or third aspect;
(ii) destroying one or more of said pollutants by irradiating the water-purifying composite material with electromagnetic radiation within the visible spectrum in the presence of an oxidizing agent.

According to a sixth aspect of the present invention there is provided a post-treated water product obtained by, obtainable by, or directly obtained by the method of water purification of the fifth aspect.

According to a seventh aspect of the present invention there is provided a use of a water-purifying composite material as defined herein in the purification of water containing or suspected to contain one or more pollutants.

According to an eighth aspect of the present invention there is provided a method of regenerating a used water-purifying composite material, the method comprising:
(i) irradiating the used water-purifying composite material with electromagnetic radiation within the visible spectrum, optionally in the presence of an oxidizing agent; and
(ii) optionally washing the regenerated water-purifying composite material.

According to an ninth aspect of the present invention there is provided a method of preparing a water-purifying composite material or otherwise increasing the water-purifying activity of a water-purifying composite, comprising:
(i) providing a pre-transformed composite material comprising or consisting of an aluminosilicate mineral material comprising pre-active metal species;
(ii) transforming the pre-active metal species into a photocatalytic metal compound immobilized within the aluminosilicate mineral material;
wherein the photocatalytic metal compound absorbs electromagnetic radiation within the visible spectrum.

In further aspects of the present invention, the "aluminosilicate mineral material" defined in relation to any of the aforementioned aspects (or defined in relation to any of the aspects or embodiments described hereinafter) is optionally replace by or supplemented by "a magnesiosilicate mineral material and/or a ferrosilicate mineral material". As such, any reference to an "aluminosilicate mineral material" in relation to any of the aforementioned aspects (or aspects or embodiments described hereinafter) may optionally be considered a reference to "an aluminosilicate mineral material and/or a magnesiosilicate mineral material and/or a ferrosilicate mineral material". For instance, in a further aspect of the present invention, there is provided a method of preparing a water-purifying composite material, the method comprising:

(i) providing a pre-transformed composite material comprising or consisting of:
an aluminosilicate mineral material comprising a non-crystalline pre-active metal species; and/or
a magnesiosilicate mineral material and/or a ferrosilicate mineral material comprising a non-crystalline pre-active metal species;
(ii) transforming the pre-active metal species into a crystalline photocatalytic metal compound immobilized within the aluminosilicate mineral material, the magnesiosilicate mineral material, and/or the ferrosilicate mineral material;

wherein the photocatalytic metal compound absorbs electromagnetic radiation within the visible spectrum.

Features, including optional, suitable, and preferred features of any aspect of the present invention may, where appropriate, be also features, including optional, suitable, and preferred features of any other aspect of the present invention.

BRIEF DESCRIPTION OF THE DRAWINGS

For a better understanding of the present invention, and to show how embodiments of the same are put into effect, reference is now made, by way of example, to the following figures, in which:

FIG. 3 shows phenol degradation in light. In particular FIG. 3 shows the destruction of the phenol by-products p-benzoquinone (diamonds), catechol (triangles), and hydroquinone (squares) over time.

FIG. 4 shows phenol degradation in the dark. In particular FIG. 4 shows the destruction of the phenol by-products p-benzoquinone (diamonds), catechol (squares), and hydroquinone (triangles) over time.

FIG. 5 shows phenol degradation with magnetite Fulacolor™ nanocomposite treated with stoichiometric hydrogen peroxide in the light. In particular FIG. 5 shows the concentrations of phenol÷10 (diamonds) and the phenol by-products p-benzoquinone (triangles), catechol (squares), and hydroquinone (triangles) over time.

DETAILED DESCRIPTION OF THE INVENTION

Definitions

Herein, the term "purification", when used in relation to a process of purifying water using composite materials of the invention, includes where by-products of the purification process may remain within the "purified" water. However, such by-products are suitably less harmful and toxic to humans than the original pollutants destroyed in the purification process and they are present in very low residual concentrations, typically <1 mole % of the original phenol concentration. In some embodiments, the water may be further processed to transform or remove the said by-products.

Herein, the term "nanocrystals" and "nanocrystalline" is intended to refer to crystal particles having at least one dimension measuring less than or equal to 100 nm, suitably at least two dimensions, and potentially all three dimensions. Nanocrystals are discernible during their production by X-ray diffraction analysis, which shows the relevant characteristic x-ray peaks becoming increasingly broad (during the "transforming" process) until the peaks are lost within the noise of the baseline signal. High intensity synchrotron radiation can be used to increase the sensitivity of the analysis to better discern the specific nanocrystals. Other techniques known in the art may also be used to confirm the presence and/or nature of nanocrystals.

Herein, where a compound or species is said to absorb electromagnetic radiation within the visible spectrum (i.e. visible light), unless otherwise stated, this is intended to mean that the compound or species has spectroscopic absorbance peaks in some or all of the visible electromagnetic spectrum (typically between 380 nm and 720 nm, suitably between 420 nm and 700 nm. This can be discerned by methods known in the art, such as visible spectroscopic analysis of a sample of the relevant compound or species.

Herein, d-block and f-block metals and metal species relate to the d-block and f-block elements of the standard periodic table, that is element groups 3-12 for d-block elements, and lanthanides and/or actinides for f-block elements. Both groups of metals and metal species are distinct from s-block or p-block metals or elements.

Unless stated otherwise, any reference herein to an "average" value is intended to relate to the mean value.

General Methodology and Advantages of the Invention

The present invention provides novel water-purifying materials that can be used as heterogeneous catalysts in oxidative photocatalytic water purification treatments that eliminate or reduce water pollutants before water is discharged into the environment.

The present invention produces water-purifying composite materials through growing photocatalytic metal compounds in situ within aluminosilicate mineral materials, such as clays or zeolites. Typically, pre-active metal species, such as iron (III) and/or iron (II) cations, are first introduced into the aluminosilicate mineral material via ion-exchange, to replace the native ions originally residing in interlayer regions or pores of the aluminosilicate. The pre-active metal species may then be activated by transforming them, in situ within the interlayer regions or pores of the aluminosilicate, into the photocatalytic metal compound. Such a transformation typically requires the application of heat over a suitable period of time. The interlayer regions or pores typically control the growth of a crystalline form of the photocatalytic metal compound such that highly catalytically active nanocrystals are produced. The nanocrystals thus formed suitably behave as semiconductors that can be activated through irradiation with visible light to promote catalytic electrons from a valence band into a conduction band to thereby make electrons available to catalyse reactions, such as a photo-Fenton reaction, in the presence of an oxidizing agent. Such a photo-Fenton reaction may then provide active pollutant destroying species, such as hydroxyl radicals.

Though not wishing to be bound by theory, the inventors believe that the unique and advantageous properties of these novel catalysts arise from their (substantially) nanocrystalline structure and semiconductive properties. This facilitates rapid oxidative photocatalytic destruction of water pollutants using environmentally benign species that can be easily separated from purified water after use.

The water-purifying materials of the invention are inexpensive to produce and use, especially as natural daylight may be used to provide the relevant electromagnetic radiation.

The water-purifying materials of the invention are simple to make and straightforward to use in water-purification treatments.

The water-purifying materials of the invention may serve as heterogeneous catalysts and are thereby simple to remove from purified water following their use in water treatments. Furthermore, the relevant catalytic species within the water-purifying materials do not leach, and therefore do not contaminate the treated water nor do they degrade during use. In fact, the water-purifying materials of the invention can generally be regenerated via a very simple process, typically via irradiation optionally in the presence of an oxidizing agent. As such, the water-purifying materials of the invention are extremely robust and durable, whilst retaining their catalytic activity.

The water-purifying materials of the invention are also absorbent of pollutants, and thus enable reduced loadings during water treatments.

Water-Purifying Composite Material and the Preparation Therefor

The present invention provides a water-purifying composite material and a preparation method therefor as defined herein.

The water-purifying composite material of the invention suitably comprises an aluminosilicate mineral material and a crystalline photocatalytic metal compound immobilised therein.

Suitably, the weight ratios of aluminosilicate mineral material to crystalline photocatalytic metal compound are respectively between 80:20 to 99.9:1, suitably between 90:10 to 99:1, suitably between 92:8 to 98:2. Such weight ratios may be measured by reference to the total weight of aluminosilicate mineral in the composite material compared to the total weight of the relevant metal species within the composite material (i.e. weight of the metallic element concerned, regardless of its compound form). This can be established by methods well known in the art.

The water-purifying composite material may comprise a further oxidant, such as an oxidant as defined anywhere herein. For instance, the composite material may additionally comprise hydrogen peroxide. Suitably, any such oxidant is biodegradable or otherwise environmentally benign.

Aluminosilicate Mineral Material

The aluminosilicate mineral material suitably provides support for the photocatalytic metal compound, suitably solid support therefor, though the photocatalytic metal compound need not necessarily be covalently immobilized upon said support (though in some embodiments it can be). The aluminosilicate mineral material suitably prevents leaching of the photocatalytic metal compound contained therein, suitably as discernible from any one or more of the comparative washing/elution analytical tests defined herein.

The aluminosilicate mineral material suitably provides a means of controlling the growth of the crystalline photocatalytic metal compound, and in particular suitably provides control of the size of the crystals grown in situ within the aluminosilicate mineral material. The space within the aluminosilicate mineral structures, whether within the interlayer regions of clays or pores of zeolites, suitably physically constrains the growth of crystals of photocatalytic metal compound therein, and can thereby afford crystals of optimum size for the required catalytic activity. Suitably, the aluminosilicate mineral material provides a structure facilitating the growth of nanocrystalline photocatalytic metal compound therein. Clay interlayers (especially non-acid activated forms thereof) are considered ideal to produce nanocrystalline forms of the photocatalytic metal compound, which are ideal for catalysis of water-purification.

The aluminosilicate mineral material suitably provides a local acidic environment to further facilitate catalysis of water-purification.

The aluminosilicate material is suitably absorbent of one or more of the one or more pollutants to be destroyed during water purification. Suitably the aluminosilicate mineral material is absorbent of phenol and/or phenol derivatives. Suitably the aluminosilicate mineral material is absorbent of some or all of the by-products of the water-purification treatments defined herein.

The aluminosilicate mineral material is suitably a mineral (suitably crystalline mineral) comprising or composed of aluminium, silicon, and oxygen, along with countercations (e.g. $Na^+$ or $Ca^{2+}$ though, as will be apparent, the counterions can be exchanged for "pre-active metal species"). In some embodiments, however, the aluminosilicate mineral materials may comprise isomorphous substitutes, such as $Mg^{2+}$ for $Al^{3+}$ (this can lead to an overall negative charge.

Aluminosilicate mineral materials are well known in the art, and in the context of the present invention the aluminosilicate mineral material may suitably be a clay mineral or zeolite (i.e. hydrated aluminosilicates) or suitable derivatives thereof.

In an embodiment, the aluminosilicate mineral material is or comprises a clay mineral. Clay minerals are typically layered structures. For instance, a clay mineral may comprise layers of tetrahedrally coordinated silica units (T) alternating with layers of repeating metal oxide units (usually aluminium or magnesium oxides) that are octahedrally coordinated (O). The tetrahedral (T) layers and octahedral (O) layers are typically bonded together via shared oxygen atoms. Two common layered arrangements are repeating patterns of T-O-T layers (i.e . . . T-O-T . . . T-O-T . . . T-O-T . . . ) or T-O layers (i.e. . . . T-O . . . T-O . . . T-O . . . ). Such layered clays are suitably lamellar materials comprising interlayer regions/space between the repeating aluminosilicate layers. The abovementioned countercations (whether pre-exchanged or post-exchanged to thereby contain pre-active metal species) are suitably located in said interlayer regions. Where clays comprise the aluminosilicate mineral materials of the invention, the crystalline photocatalytic metal compound is suitably grown within these interlayer regions to thereby suitably provide catalytic activity when destroying pollutants in the water treatments described herein.

In a particular embodiment, the aluminosilicate mineral material is or comprises a clay mineral, suitably a bentonite or bentonite-derived clay. In a particular embodiment, the aluminosilicate material is a montmorillonite clay, suitably derived from bentonite clay. The clay may be Fulacolor® clay.

In an embodiment, the clay is a sedimentary purified clay.

In a particular embodiment, the clay is a non-acid activated clay.

In an embodiment, the aluminosilicate mineral material is or comprises a zeolite mineral material. Zeolites typically have a caged porous structure, as opposed to the layered structure of clays. The pores may comprise countercations in much the same manner as the interlayer regions of the clays comprises such counterions. Likewise, crystalline photocatalytic metal compound may be grown within said pores to thereby suitably provide catalytic activity when destroying pollutants in the water treatments described herein.

In an embodiment, the aluminosilicate mineral material is a mixture of aluminosilicate mineral materials, such as a mixture of clay and zeolite minerals.

The catalyst "silica-alumina" is an amorphous substance which is suitably excluded as an aluminosilicate mineral material of the present invention.

As aforementioned, any reference herein to an "aluminosilicate mineral material" may optionally be considered a reference to "an aluminosilicate mineral material and/or a magnesiosilicate mineral material and/or a ferrosilicate mineral material", since it has been surprisingly demonstrated that the principles of the present invention are equally applicable to these other mineral materials. As such, all features and combinations of features including optional, suitable, and preferred features stipulated herein in relation to an "aluminosilicate mineral material" may, where appropriate, also be features or combinations of features, including optional, suitable, and preferred features in relation to an aluminosilicate mineral material, a magnesiosilicate mineral material, and/or a ferrosilicate mineral material. However, in preferred aspects and embodiments, the invention relates to the use of aluminosilicate mineral material alone, though optionally the aluminosilicate mineral material may naturally comprise additional metal species, for instance, magnesium and/or iron.

Non-Crystalline Pre-Active Metal Species

In the context of the present invention, aluminosilicate mineral materials may be modified by exchanging countercations contained therein (e.g. those naturally occurring, such as $Na^+$ and/or $Ca^{2+}$ hydrates) with more pre-active metal counterions, such as the pre-active metal species of the present invention. Catalytic properties are then advantageously brought about by inducing a transformation to convert said pre-active metal species into photocatalytic metal compound.

The non-crystalline pre-active metal species are suitably countercations within the aluminosilicate mineral materials, suitably associated with anions (e.g. oxide anions) disposed upon a surface of the aluminosilicate mineral material. The non-crystalline pre-active metal species are suitably pre-active metal cations within interlayer regions and/or pores of the aluminosilicate mineral material. The non-crystalline pre-active metal species are suitably cations within the interlayer regions of a clay mineral material and/or the pores of a zeolite mineral material. The non-crystalline pre-active metal species are therefore suitably cations present within ion-exchangable sites of the aluminosilicate mineral material.

The pre-active metal species suitably saturate the ion-exchange sites within the aluminosilicate mineral material (i.e. such that substantially no more of the relevant pre-active metal species can be exchanged into the mineral material), suitably at least 90% saturated, suitably at least 95% saturated, suitably substantially 100% saturated. Suitably the pre-active metal species are present within the aluminosilicate mineral material so as to constitute at least 90% of the cation exchange capacity of the aluminosilicate material, suitably at least 95% thereof, suitably substantially 100% thereof. Cation exchange capacity (CEC) is a term of art relating to the maximum quantity of total cations, of any class, that a soil (including herein aluminosilicate mineral materials) is capable of holding, at a given pH value, available for exchange with the soil solution).

Suitably the non-crystalline pre-active metal species are introduced into the aluminosilicate mineral material, suitably into said ion-exchangable sites thereof (e.g. interlayer regions or pores), through an ion-exchange process, such as that described herein. The non-crystalline pre-active metal species may be introduced into the aluminosilicate mineral material via a pre-active metal salt, suitably a solution thereof, most suitably an aqueous solution thereof, suitably in an ion-exchange process with the aluminosilicate material (typically involving suitable contact between the aluminosilicate mineral material and metal salt solution).

The pre-active metal species suitably has access to two or more kinetically stable cationic oxidation states.

The pre-active metal species suitably comprise or consist of metal cations, suitably with a charge (i.e. oxidation state) of +2 or greater. Suitably, at least some of the pre-active metal species are metal cations with a charge of at least +3 or greater.

The pre-active metal species suitably comprise or consist of d-block or f-block metal cations, most suitably d-block metal cations. Suitably the pre-active metal species comprise or consist of metal cations selected from the group including cations of iron, chromium, titanium, zirconium, copper, manganese or a mixture thereof. Suitably the pre-active metal species comprise or consist of metal cations selected from the group including cations of iron, chromium, titanium, zirconium, copper, or a mixture thereof. In a particular embodiment, the pre-active metal species comprise or consist of iron cations. In a particular embodiment, the pre-active metal species comprise iron (III) cations. In a particular embodiment, the pre-active metal species comprise both iron (III) cations and iron (II) cations.

The metal salts used to incorporate the pre-active metal species into the aluminosilicate mineral material suitably include those that are water soluble. In embodiments wherein the pre-active metal species comprise iron (III) cations, the metal salts used in the original ion-exchange reactions may include, by way of example, iron (III) nitrate, iron (III) chloride, or iron (III) sulphate, suitably in aqueous solution form.

Suitably, the pre-active metal species are themselves ion-exchangable or removable from within the aluminosilicate mineral material (or at least to an extent). For instance, suitably the pre-active metal species can be washed/eluted out using washing/elution protocols such as those defined herein to test immobilization of the photocatalytic metal compound. Suitably such ion-exchangability or removability contrasts with the immobilized nature of the photocatalytic metal compound derived from the pre-active metal species.

In an embodiment, the pre-active metal species absorbs visible light. In a particular embodiment, the oxide and/or hydroxide form of the pre-active metal species absorbs visible light.

Photocatalytic Metal Compound

The photocatalytic metal compound is formed following appropriate in situ transformation of the pre-active metal species defined herein within the aluminosilicate mineral material. As such, the photocatalytic metal compound is different to the pre-active metal species, though suitably derived therefrom. The photocatalytic metal compound may suitably comprise the pre-active metal species but in a transformed arrangement, for example, linked together, suitably by intervening atoms (e.g. oxygen atoms).

Suitably, the photocatalytic metal compound is polymeric in form. The photocatalytic metal compound suitably comprises metal oxides, which may suitably include oxides, hydroxides and/or oxyhydroxides, all of which are suitably aqueous insoluble. The photocatalytic metal compound suitably comprises polymeric metal oxides. Suitably the photocatalytic metal compound comprises at least some metal oxyhydroxides, suitably polymeric metal oxyhydroxides. Suitably, the photocatalytic metal compound comprises or consists of metal oxide pillars. The oxide forms of the photocatalytic metal compound is suitably discernible by methods well known in the art.

The photocatalytic metal compound suitably absorbs visible light.

The photocatalytic metal compound is suitably photosensitive.

The photocatalytic metal compound is suitably a semiconductor, suitably providing a valence band and conduction band for electrons. Suitably at least some electronic transitions between the valence band and conduction band (i.e. transition energies) lie within the visible region of the electromagnetic spectrum (i.e. transitions can be induced through irradiation with visible light).

Suitably the photocatalytic metal compound resides within interlayer regions and/or pores of the aluminosilicate mineral material, most suitably within interlayer regions, for example, in clay structures.

Suitably the size of the crystals of the photocatalytic metal compound is influenced by the size of the interlayer regions and/or pores within which they are contained within the aluminosilicate mineral material. Suitably the shape of the crystals of the photocatalytic metal compound is influenced by the shape of the interlayer regions and/or pores within which they are contained within the aluminosilicate mineral material. Suitably the crystals of the photocatalytic metal compound are trapped within the relevant interlayer regions and/or pores within the aluminosilicate mineral material.

Suitably the crystals of the photocatalytic metal compound are catalytically active within the relevant interlayer regions and/or pores within the aluminosilicate mineral material, and can suitably make contact with pollutants within water during the water treatments defined herein.

Suitably the crystalline photocatalytic metal compound is a nanocrystalline photocatalytic metal compound. Such nanocrystalline species have been shown to be extremely catalytically active.

The relevant metal species of the photocatalytic metal compound suitably comprise or consist of metal species with a charge (i.e. oxidation state) of +2 or greater. Suitably, at least some of the relevant metal species of the photocatalytic metal compound are metal species with a charge of at least +3 or greater.

The photocatalytic metal compound suitably comprises or consists of d-block or f-block metal species, most suitably d-block metal species. Suitably the photocatalytic metal compound comprises or consists of metal species selected from the group including species of iron, chromium, titanium, zirconium, copper, manganese, or a mixture thereof. Suitably the photocatalytic metal compound comprises or consists of metal species selected from the group including species of iron, chromium, titanium, zirconium, copper, or a mixture thereof. In a particular embodiment, the photocatalytic metal compound comprises or consists of iron species. In a particular embodiment, the photocatalytic metal compound comprises iron (III) species. In a particular embodiment, the photocatalytic metal compound comprises both iron (III) species and iron (II) species.

In embodiments where the photocatalytic metal compound comprises both iron (III) species and iron (II) species, suitably the photocatalytic metal compound is a form of magnetite ($Fe_3O_4$). However, the photocatalytic compound (or a portion thereof) may be a form of Akaganeite and/or Goethite, optionally in addition to magnetite. Suitably, in such embodiments, the ratio of iron (II) to iron (III) is between 30:70 and 70:30, suitably between 40:60 and 60:40, suitably between 55:45 to 70:30, though most suitably about 60:40.

The photocatalytic metal compound is immobilized within the aluminosilicate material, suitably as defined herein.

Suitably the photocatalytic metal compound is capable of generating hydroxyl radicals in the presence of peroxides, such as hydrogen peroxide. Suitably the photocatalytic metal compound is capable of initiating Fenton or Photo-Fenton reactions, well known in the art, suitably in the presence of peroxides such as hydrogen peroxide.

Providing an Aluminosilicate Mineral Material with Non-Crystalline Pre-Active Metal Species In preferred embodiments, "providing" a pre-transformed composite material involves incorporating pre-active metal species into an aluminosilicate mineral material that is (substantially) free of or deficient in (i.e. not sufficiently saturated with, e.g. with an insufficiently saturated cation exchange capacity) the pre-active metal species. This may involve performing ion-exchange to transform a pre-exchanged aluminosilicate mineral material comprising pre-exchanged metal cations (e.g. one free of or deficient in the pre-active metal species) into a post-exchanged aluminosilicate mineral material (i.e. one in which pre-active metal species are incorporated or added). Incorporating the pre-active metal species may comprise performing ion-exchange upon a "pre-exchanged" aluminosilicate mineral material, suitably (substantially) free of or deficient in the pre-active metal species, to thereby exchange pre-exchanged metal cations (e.g. $Na^+$ and/or $Ca^{2+}$) present within the aluminosilicate material with pre-active metal species/cations (e.g. $Fe^{2+}$ and/or $Fe^{3+}$) and form a post-exchanged aluminosilicate mineral material. The pre-exchanged metal cations are suitably different from the pre-active metal species/cations, and are suitably s-block or p-block metal cations.

Ion-exchange suitably replaces at least 50% of the pre-exchanged metal cations with pre-active metal species, suitably at least 70%, suitably at least 90%, most suitably at least 95%. Such exchange can be readily determined by methods well known in the art.

Performing ion-exchange upon the pre-exchanged aluminosilicate mineral material may suitably involve contacting the pre-exchanged aluminosilicate mineral material with an ion exchange medium, suitably comprising a salt form of the pre-active metal species, suitably an aqueous solution of a salt form of the pre-active metal species (e.g. an iron salt, such as an iron (III) and/or iron(II) salt). In a particular embodiment, the salt form of the pre-active metal species comprises an aqueous solution of an iron (III and/or II) salt, for example, iron (III and/or II) nitrate, iron (III and/or II) chloride, iron (III and/or II) sulphate. Contacting suitably involves suspending the pre-exchanged aluminosilicate mineral material in an aqueous solution of the salt form of the pre-active metal species, optionally at elevated temperature (e.g. 40-90° C., suitably 60-80° C.). Suitably, "contacting" the pre-exchanged aluminosilicate mineral material with the ion-exchange medium is performed for a time sufficient to incorporate the required amount of pre-active metal species within the aluminosilicate mineral material, suitably for at least 5 minutes, suitably at least 30 minutes, suitably at least 50 minutes.

Suitably, ion-exchange is performed in a reaction vessel or purpose-built column.

The post-exchanged aluminosilicate mineral material may be the pre-transformed composite material. However, the post-exchanged aluminosilicate mineral material may be optionally further processed to produce the pre-transformed composite material. Suitably, the post-exchanged material is separated from the ion-exchange medium (e.g. through filtration). The post-exchanged aluminosilicate mineral material may be washed, for instance with water (e.g. distilled or deionised water). The post-exchanged aluminosilicate mineral material may be dried, for instance by vacuum filtration, oven drying, and/or vacuum drying. The post-exchanged aluminosilicate material may be powdered or granulated.

In a particular embodiment, "providing" a pre-transformed composite material involves:

Suspending a clay mineral in an ion-exchange medium comprising an aqueous solution of an iron (III) salt (and optionally also an iron (II) salt), for example, iron (III) nitrate, iron (III) chloride, iron (III) sulphate, to form an ion-exchange mixture;

Heating and/or agitating the ion-exchange mixture for at least 10 minutes, suitably for about 1 hour, to form a post-exchanged clay;

Washing the post-exchanged clay with distilled water;

Drying the washed post-exchanged clay (e.g. in an oven at 60° C. for 12 hours);

Granulating and/or powdering the post-exchanged clay (e.g. through grinding).

The pre-transformed composite material, once formed, is suitably saturated with pre-active metal species.

Crystallising Photocatalytic Metal Compound In Situ within Aluminosilicate Mineral Transforming the pre-active metal species into a crystalline photocatalytic metal compound immobilized within the aluminosilicate mineral material is hereinafter abbreviated to the "transformation process". The transformation process is suitably an artificial (i.e. non-natural) process that is artificially induced and controlled.

The transformation process may comprise any process that facilitates the formation of crystalline photocatalytic metal compound in situ within the aluminosilicate mineral material. The transformation process suitably involves converting the pre-active metal species, which are still potentially ion-exchangeable within the aluminosilicate material, to a form that is non-exchangeable and suitably non-removable.

The transformation process suitably involves growing crystals within the aluminosilicate mineral material, suitably crystals of the photocatalytic metal compound. Suitably such crystals are grown within interlayer regions and/or pores of the aluminosilicate mineral material. Suitably the size and/or shape of the crystals are influenced or even pre-determined by the size and/or shape of the interlayer regions and/or pores of the aluminosilicate mineral material. Suitably at least some of the crystals are nanocrystals.

The transformation process suitably involves polymerization of the pre-active metal species, suitably via intervening atoms, such as oxygen atoms. Such polymerization may constitute the growth of crystals described above. Such polymerization may be gradual over time, with longer chain lengths being formed over longer periods. The extent of polymerization may be influenced or even pre-determined by the size and/or shape of the interlayer regions and/or pores of the aluminosilicate mineral material.

The transformation process suitably involves transforming the pre-active metal species into photocatalytic metal oxides, which may suitably include oxides, hydroxides and/or oxyhydroxides. Most suitably, the transformation process involves the formation of metal oxyhydroxides.

The transformation process is suitably performed until the relevant metal species (whether derived from the pre-active metal species, photocatalytic metal compound, or any intermediates therebetween) are immobilized, suitably immobilized as defined herein. As such, the transformation process may involve monitoring to assess the degree of transformation and/or to determine completion of transformation.

The transformation process may, at least to some extent, change the oxidation state of some or all of the relevant metal species, though this need not necessarily occur.

The transformation process suitably involves heating (suitably artificially heating, e.g. in an oven) the pre-transformed composite material, suitably heating sufficiently to immobilize the relevant metal species. Suitably, the transformation process involves heating the pre-transformed composite material at a sufficient temperature for a sufficient time to immobilize the relevant metal species. Suitably, the transformation process involves heating the pre-transformed composite material at a sufficient temperature for a sufficient time to crystallize the photocatalytic metal compound. Suitably, heating involves heating at a temperature above 60° C., suitably above 80° C., suitably above 100° C., suitably above 110° C., suitably above 120° C. Suitably, heating involves heating at a temperature below 300° C., suitably below 200° C., suitably below 150° C., suitably below 140° C. Suitably heating is performed for a sufficient time period for the required immobilization and/or crystallization to occur, suitably at least 5 days, suitably at least 15 days, suitably at least 25 days, suitably at least 30 days. Suitably heating is performed for at most 365 days, suitably at most, 120 days, suitably at most 90 days, suitably at most 60 days, suitably at most 40 days. Suitably the pre-transformed composite material is heated under conditions that replicate heating at 130° C. for 25-40 days.

It should be noted that overheating may lead to the formation of haematite, which has low photocatalytic activity.

In alternative embodiments, the transformation process involves contacting the pre-transformed material with an alkaline aqueous medium, suitably with a pH of between 8 and 14, more suitably a pH between 9 and 13, more suitably a pH between 10 and 12, most suitably a pH between 10.5 and 11.5, to produce an alkaline mixture of the pre-transformed material. Such "contacting" may be achieved by simply basifying the ion exchange medium within which the post-exchanged aluminosilicate mineral material (or pre-transformed composite material) is contained. However, in alternative embodiments, pre-transformed composition material which has been isolated or separated from the ion exchange medium may be contacted with a fresh alkaline aqueous medium. Suitably the alkaline aqueous medium comprise a base, suitably a volatile base, such as ammonia (or ammonium hydroxide). Suitably, the alkaline mixture of the pre-transformed material is heated, suitably at a temperature between 40 and 110° C., suitably between 50 and 100° C., suitably between 55 and 95° C., for between 10 minutes and 5 hours, suitably for between 20 minutes and 3 hours, suitably 30 minutes and 2 hours. Suitably the alkaline mixture of the pre-transformed material is stirred during this time of heating. After the alkaline treatment and the optional heat treatment, the alkaline mixture of the pre-transformed material is suitably filtered or centrifuged to isolate the solid, and the solid is thereafter suitably dried, suitably at a temperature less than or equal to 150° C., suitably at a temperature between 60 and 150° C., for between 2 days and 21 days, suitably for between 5 and 16 days.

Determining the Level of Immobilization

In accordance with the present invention, water-purifying composite materials exist or are deemed produced where the crystalline photocatalytic metal compound is immobilised within the aluminosilicate mineral material. Typically, the non-crystalline pre-active metal species are not immobilized (or not completely so) within the starting pre-transformed composite material provided, and can be extracted from the aluminosilicate mineral material by certain washings/elutions (such as those outlined below). The pre-active metal species are suitably cationic metal species, suitably metal cations exchanged (and/or exchangeable) within the aluminosilicate mineral material, most suitably associated with counteranions disposed upon a surface of the aluminosilicate mineral material. The pre-active metal species are suitably transformed (over time), during step (ii) of the method of the invention, into crystalline photocatalytic metal compound which cannot (or cannot easily) be displaced within or removed from the aluminosilicate mineral material, typically due to the large size and/or insolubility of said crystalline photocatalytic metal compound.

The resulting photocatalytic metal compound may, in some embodiments, be immobilized through being chemically bonded to the aluminosilicate mineral material, for instance bonded to a surface thereof. However, the photocatalytic metal compound may, in some embodiments, be immobilized through non-chemical bonding, whether by physical restraints or forces maintaining the photocatalytic metal compound in association with the aluminosilicate material.

Suitably, the crystalline photocatalytic metal compound is immobilised within the aluminosilicate mineral material in that said photocatalytic metal compound (or a derivative thereof, e.g. a decomposed or otherwise digested derivative) cannot be removed (or at least not to any significant extent) from the aluminosilicate mineral material through washing or elution (e.g. following slurrying in a relevant medium or elution through a column) of the aluminosilicate mineral material, such as through washing/eluting with water, an aqueous solution of potassium chloride, and/or an aqueous solution of hydrogen chloride.

In a particular embodiment, immobilization (or sufficient immobilization to indicate a water-purifying composite material of the invention) of the crystalline photocatalytic metal compound (or relevant metal species associated therewith) within the aluminosilicate mineral material is confirmed by comparing washing/elution output concentrations of "relevant metal species", within a particular washing/elution medium, following comparative analytical washes/elutions performed upon samples of both pre- and post-transformed crystalline materials (i.e. before and after transforming the pre-active metal species into the crystalline photocatalytic metal compound).

Such comparative analytical washings/elutions may involve a single wash/elution per sample or multiple washes/elutions per sample (with different or the same washing/elution media). Where multiple washes/elutions are used in comparative analytical tests, one, some, or all of the washes/elutions may be used to calculate the relevant "output concentrations". In some embodiments, a pre-wash/elution may be performed to remove certain species (e.g. to remove the bulk of the pre-active metal species but not transformed or partially transformed metal species). Preferably, however, any output concentrations and/or ratios thereof relate to output concentrations of all washes containing the "relevant metal species", whether pre-active metal species or partially transformed metal species.

Such comparative analytical washes/elutions may be performed via methods well known in the art and, for example, using a common set of pre-designated conditions, e.g. with respect to: sample size/weight, the nature of washing/elution media, relative proportions of washing/elution media and pre- and post-transformed composite material, washing/elution conditions, etc. As "pre-active metal species" are increasingly transformed into the "photocatalytic metal compound" within the aluminosilicate mineral material, the relevant metal species (i.e. those common to both the "pre-active metal species" and "photocatalytic metal compound", though these metal species may or may not differ in oxidation state depending on the circumstances) become increasingly difficult to extract (i.e. via washing or elution). The more "transforming" that occurs, the more immobilized the relevant metal species become—typically they become increasingly trapped within the aluminosilicate mineral material by virtue of their increasing size and/or association with the aluminosilicate mineral material. As a consequence, the washing/elution output concentrations decrease as transformation ensues.

A water-purifying composite material is suitably produced when the ratio of washing/elution output concentrations (of "relevant metal species") measured for pre- and post-transformed materials (i.e. starting material from step (i) and post-transformed being tested) is respectively more than 1.1:1 (i.e. 1.1 or more: 1), suitably more than 2:1, suitably more 5:1, suitably more than 10:1, suitably more than 100:1, suitably more than 1000:1—NB. the output concentrations are inevitably higher for the starting pre-transformed composite materials, where the relevant metal species are least immobilized. The higher the ratio, the less "transformed" the original pre-transformed composite material provided, which in some embodiments is desirable to ensure optimum quality of the water-purifying composite material. Suitably the aforementioned applies where the common set of pre-designated washing/elution conditions for the comparative analytical washing/elution tests are (especially where the relevant metal species are iron-based, e.g. Fe(III) and/or Fe(II)):

The washing/elution medium is 0.1M aqueous hydrogen chloride (HCl) solution;
Washing/elution is performed at standard ambient temperature and pressure (i.e. 25° C. and 100 kPa);
The weight ratio of medium to pre- or post-transformed composite material is between 1:1 and 100:1, suitably 10:1;
Washing/elution is sufficiently thorough to extract at least 90% of the relevant metal species that are possible to extract from the given pre- or post-transformed composite material over a 24 hour period under the prevailing common set of pre-designated conditions, suitably at least 95%, suitably at least 99%, suitably 100%.

Optionally the above comparative analytical washing/elution test may be performed following prior washings with a 1M aqueous potassium chloride solution (equivalent amounts as per HCl washes). In some embodiments, the KCl washes may be included within any calculation for "output concentrations" whereas in other embodiments they need not.

The relevant metal species are those derived from the "non-crystalline pre-active metal species", the "crystalline photocatalytic metal compound", or any intermediate metal species therebetween, and may be decomposed or otherwise digested derivates resulting from the washing/elution process.

Suitably, however, immobilization may ultimately be deemed complete when any further performance of "transforming" step (ii) (i.e. the "transformation process") gives rise to no further immobilization, as discernible from (substantially) no further decreases in washing/elution output concentrations when two comparative samples (before and after "further transforming") are subjected to comparative washing/elution analytical tests (optionally via any of the abovementioned measuring techniques). In a particular embodiment, immobilization is deemed complete when further "transforming" decreases the washing/elution output concentrations of the relevant metal species in comparative analytical tests (before and after "further transforming") by no more than 10%, suitably by no more than 2%, suitably by no more than 1%, suitably by no more than 0.1%, suitably by no more than 0.001%. Such immobilization completion tests need not relate in any way to the washing/elution output concentrations of pre-transformed composite material, though the two tests may be used in parallel or separately to discern different properties of the water-purifying composite material (i.e. how non-immobilised the relevant metal species were to start with, and how complete the immobilization is) . . . .

Quantitative analysis of output concentrations of the relevant metal species depends on the relevant metal species in question, and could be judiciously selected by the person skilled in the art. Clearly various quantitative analyses can be employed for various different metal species, and may include titration analyses, spectroscopic or spectrometric analyses, or other quantitative methods. In the case of where iron cations are the relevant metal species, quantitative iron cation analysis may be performed using ICPMS, thiocyanate complexation/uv-visible spectrophotometry, ion chromatography, etc Determining Crystallisation Suitably, in accordance with the invention, crystallization of the non-crystalline pre-active metal species into the crystallized photocatalytic metal compound may be considered to have occurred wherever immobilization is deemed to have taken place. Suitably crystals of the photocatalytic metal compound are trapped (i.e. immobilized) within the structure of the aluminosilicate material. As such, suitably, crystals are grown in situ within the aluminosilicate material so as to become immobilized therein.

However, crystallization of the metal species within the aluminosilicate mineral material is suitably discernible by X-ray diffraction experiments, especially through time-course x-ray diffraction experiments monitoring the x-ray diffraction pattern at time intervals during the "transforming" process (e.g. via heat/baking of a composite material) described herein.

In a particular embodiment, the crystalline photocatalytic metal compound is a nanocrystalline photocatalytic metal compound (i.e. nanocrystals thereof). Herein, the term "nanocrystals" and "nanocrystalline" is intended to refer to crystal particles having at least one dimension measuring less than or equal to 100 nm, suitably at least two dimensions, and potentially all three dimensions. Nanocrystals are discernible during their production by X-ray diffraction analysis, which shows the relevant characteristic x-ray peaks becoming increasingly broad (during the "transforming" process) until the peaks are lost within the noise of the baseline signal. High intensity synchrotron radiation can be used to increase the sensitivity of the analysis to better discern the specific nanocrystals.

Specific Embodiments

In a particular embodiment, the relevant metal species of both the pre-active metal species and the photocatalytic metal compound comprises iron species, for example, Fe(II) and/or Fe(III), and the aluminosilicate mineral material is a clay, for example, a montmorillonite clay. Suitably, in such embodiments, the water-purifying composite material is formed by heating over time, suitably heating at a temperature above 100° C. for at least 5 days, but more suitably for at least 20 days. Such embodiments provide water-purifying composite materials that are particular appropriate for destroying phenolic-based pollutants.

In some embodiments, the water-purifying composite material is freshly prepared prior to use, and suitably no more than 2 years elapsed between its preparation and use, suitably no more than 1 year, suitably no more than 6 months.

The photocatalytic metal compound is suitably not a haematite. Suitably the water-purifying composite material is not red, especially not a deep red colour.

The water-purifying composite materials of the invention are suitably formed via a synthetic process (e.g. artificial intervention is used) rather than by any natural processes. Suitably the water-purifying composite materials are manufactured at artificially elevated temperatures.

Suitably, greater than or equal to 50% of the photocatalytic metal compound is formed through transforming pre-active metal species which were artificially introduced (following a synthetic treatment), suitably greater than or equal to 70%, suitably greater than or equal to 90%, suitably greater than or equal to 95%.

Water Treatment Device

The present invention provides a water treatment device comprising a water-purifying composite material as defined herein.

The water treatment device may be any device allowing or operable to facilitate contact between water and the water-purifying composite material.

The water treatment device may be operable to convey water through the water treatment device, suitably in a continuous flow fashion (e.g. facilitating continuous water treatment). Such water treatment devices may be considered water filtration devices.

The water treatment device may be operable to treat water via a batch process. For example, the water treatment device may comprise a tank for receiving a batch of pre-treated water (containing or suspected to contain one or more pollutants) and a means for discharging post-treated water.

The water treatment device is suitably configured to allow regeneration of the used water-purifying composite.

Method of Water Purification

The present invention provides a method of water purification comprising treating water with a water-purifying composite material of the invention. Suitably such water treatment involves:

(i) contacting water, containing or suspected to contain one or more pollutants, with a water-purifying composite material as defined in either of the second or third aspect;
(ii) destroying one or more of said pollutants by irradiating the water-purifying composite material with electromagnetic radiation within the visible spectrum in the presence of an oxidizing agent.

Contacting the water with the water-purifying composite material suitably provides a "water-purifying contact mixture". Initial contacting of the water with the water-purifying composite may suitably take place in the dark (i.e. substantially in the absence of visible light). Initial contacting of the water with the water-purifying composite may suitably take place in the absence of an oxidizing agent, or at least in the absence of a non-gaseous oxidizing agent.

The water in question may be considered pre-treated water before it is contacted with the water-purifying composite material, post-contacted water once it has been contacted with the water-purifying composite material, and post-treated water once it has been separated (or discharged) from the water-purifying composite material or subjected to treatment step (ii). In the same manner, the water-purifying composite material may be considered a pre-contacted water-purifying composite material prior to any contact with the pre-treated water, a post-contacted water-purifying composite material after contact with the water, and a "used" water-purifying composite material once water treatment is complete.

Contacting the pre-treated water with the water-purifying composite material suitably involves mixing the water-purifying composite material with the pre-treated water. This may involve passing or pumping the water through a stationary phase (e.g. a bed, column, or cartridge) of water-purifying composite material or may involve dispersing the water-purifying composite material in the water (e.g. preferably via agitation to ensure all water contacts the water-purifying composite material).

In some embodiments, following contacting step (i), the post-contacted water is separated from the post-contacted water-purifying composite material before destroying step (ii) is performed. In such embodiments, the water-purifying composite material may absorb one or more of the pollutants from the pre-treated water. As such, contacting step (i) is suitably performed for a time sufficient to ensure optimal absorption of pollutants. The post-contacted water may then be separated therefrom and optionally discharged as post-treated water. Meanwhile, the post-contacted water-purifying composite material is then suitably irradiated with electromagnetic radiation within the visible spectrum in the presence of an oxidizing agent to destroy the one or more pollutants absorbed within the post-contacted water-purifying composite material. Step (ii) may be performed directly upon a solid form of the post-contacted water-purifying composite material, or a slurried suspension thereof (e.g. in water). As such, following separation from the post-contacted water, the post-contacted water-purifying composite material may be dispersed in a further medium (e.g. water). The oxidizing agent may be added to/mixed with the post-contacted water-purifying composite material following separation of the post-contacted water, or may have been included in the "water-purifying contact mixture" during step (i). The water-purifying composite material then becomes a post-irradiated water-purifying composite material. Irradiating the water-purifying composite material in this manner (i.e. separate from the water being purified) may regenerate the water-purifying composite material for further use in further rounds of water purification, though suitably the post-irradiated water-purifying composite material is first washed (e.g. with water, such as dionised water) to remove any remaining pollutants or by-products thereof resulting from the irradiating process. In some embodiments, the water-purifying composite material may need to be irradiated in the absence of an oxidizing agent in order for it to be properly regenerated.

In preferred embodiments, destroying step (ii) is performed whilst the post-contacted water remains in contact with the post-contacted water-purifying composite material—i.e. step (ii) is performed upon the "water-purifying contact mixture". As such, the oxidizing agent is suitably present within the water-purifying contact mixture during step (ii). The oxidizing agent is suitably added between step (i) and step (ii) or during step (ii), though in some embodiments it may be included in the water-purifying contact mixture during step (i). Irradiation of the water-purifying composite material may involve irradiation of the water-purifying contact mixture or a part thereof, suitably to ensure that substantially all of the water-purifying composite material is duly irradiated. As such, the water-purifying contact mixture is suitably agitated (e.g. via mechanical stirring) to ensure that irradiation of the water-purifying contact mixture is as homogenous as possible. Following treatment step (ii), the post-treated water is suitably separated from the post-irradiated water-purifying composite material (e.g. through filtration, decanting, or otherwise) and optionally discharged. The used water-purifying composite material may then be reused, if deemed sufficiently regenerated in situ during treatment step (ii), or else regenerated as described herein.

Optionally, the progress of treatment/destroying step (ii) may be monitored, for example via pollutant analysis of either water samples taken directly from a water-purifying contact mixture undergoing treatment step (ii) or a sample of post-contacted water-purifying composite material isolated from treatment step (ii). Analysis may be performed by methods well known in the art, including HPLC and/or ion chromatography.

Destroying step (ii) is suitably performed (preferably regardless of the treatment regime) for a time sufficient to reduce/destroy one or more of the pollutants to a desired extent. The extent to which one or more of the pollutants is destroyed may be assessed via in-process monitoring, as described above. Suitably, destroying step (ii) is performed for at least 5 minutes, suitably at least 10 minutes, suitably at least 20 minutes, and suitably at least 25 minutes. However, destroying step (ii) may be performed for less than 5 hours, suitably less than 2 hours, suitably less than 1 hour.

The electromagnetic radiation within the visible spectrum used during irradiation may be any suitable form of visible light, whether artificial or natural light. In a particular embodiment, irradiation is performed using natural daylight.

Suitably, the water-purifying composite material catalyses a Fenton reaction in the presence of the oxidizing agent, and suitably a photo-Fenton reaction in the presence of the oxidizing agent and electromagnetic radiation within the visible spectrum. The Fenton reaction is well known in the art, and can be explained as follows:

Fenton Reaction:

$$Fe^{2+}+H_2O_2 \rightarrow Fe^{3+}+HO^-+HO^*$$

Photo-Fenton:

$$Fe^{III}(OH)^{2+}+h\nu \rightarrow Fe^{2+}+OH^*$$

$$Fe^{2+}+H_2O_2 \rightarrow Fe(OH)^{2+}+HO^*$$

Suitably pollutant(s) are destroyed in step (ii) of the method of water purification much quicker than prior art methods, thus reducing costs and increasing water treatment throughput. The catalysis provided by the water-purifying composite materials of the invention is suitably enhanced by the semiconductor properties exhibited by the photocatalytic metal compound within the aluminosilicate mineral material. Such a semiconductor facilitates photocatalysis, particularly the production of radicals that can be complicit in the destruction of major pollutants (e.g. phenol), through providing a means to promote electrons from a valence band to a conduction band to facilitate reduction of an oxidizing agent to provide pollutant-destroying species (e.g. hydroxyl radicals via a Fenton reaction). The water-purifying composite materials of the present invention because the energy gap between the valence and conduction bands are within the visible region of the electromagnetic spectrum, thereby allowing a more straightforward water treatment process which involves daylight irradiation rather than UV-irradiation, which is typically highly expensive, energy consuming, and complex.

The one or more pollutants may suitably include a phenolic compound, most suitably phenol itself. However, the inventors have found that the present invention is applicable to a whole range of pollutants, including a range of aromatic compounds, including (though not limited to) phenolic compounds, aniline compounds, aromatic ether compounds, aromatic carboxylic acid compounds, and aromatic ester compounds.

Oxidant

The oxidizing agent used in step (ii) of the method of water purification, may be any suitable oxidant capable of interacting and reacting with the photocatalytic metal compound. The oxidizing agent suitably reacts with the photocatalytic metal compound to yield a reactive species capable of destroying one or more of the pollutants. The oxidizing agent is suitably one which may partake in a photo-Fenton reaction as described above.

The oxidizing agent is suitably biologically and/or environmentally (substantially) benign, and suitably biodegradable.

The oxidizing agent may be a non-gaseous oxidizing agent. For instance, the oxidizing agent may be or comprise hydrogen peroxide. However, in some embodiments, the oxidizing agent may be an oxidizing metal-based compound, such as a Cr(VI) compound, though these are less preferred from a biocompatibility point of view. Non-gaseous oxidizing agents, such as hydrogen peroxide, may be suitably mixed with the water-purifying composite material during step (i) or (ii) or therebetween.

The oxidizing agent may be or comprise a gaseous oxidizing agent. For instance, the oxidizing agent may be or comprise oxygen (for instance oxygen within air). Gaseous oxidizing agents, such as oxygen or air, may be brought into contact with the water-purifying composite material during step (i) or (ii) or therebetween. The non-gaseous oxidizing agent may be a part of the prevailing atmosphere during the performance of step (ii), though the non-gaseous oxidizing agent may alternatively or additionally be passed through (e.g. bubbled through) a liquid dispersion of the water-purifying composite material (whether a water-purifying contact mixture or otherwise). Where the oxidizing agent is a gaseous oxidizing agent, suitably no other oxidizing agent (other than the photocatalytic metal compound) is present.

The amount of oxidizing agent used may depend on the level of pollutants. Additional oxidizing agent may be added during the water purification process, for instance, where monitoring shows that additional oxidizing agent is required to destroy more pollutant(s).

EXAMPLES

The invention will now be described in more detail in relation to the following illustrative examples.

Materials and Equipment

The materials employed in this work are as follows. Iron(III) nitrate nonahydrate, phenol, maleic acid, catechol, hydrogen peroxide 30%, sodium chloride and titanium(IV) oxide (Sigma Aldrich, Germany). Iron(III) chloride 6-hydrate (BDH laboratory supplies UK), hydroquinone, para-benzoquinone, oxalic acid (Lancaster Synthesis, UK), para-nitrophenol, 4-chloro-3-methyl phenol (Alfa Aesar, UK). The analytical mobile phase: phosphoric acid ACS reagent (Sigma Aldrich) and acetonitrile (Fisher Scientific, UK). The clay minerals used were a raw Wyoming bentonite (BDH) and the acid activated clay, Fulacolor™ from Rockwood additives UK.

For the initial thermal (Nuffield) work we used a Perkin Elmer Auto System XL gas chromatograph with a Turbomass Mass Spectrometer.

We also employed the following range of equipment. Varian Chromapack CP-3380 Gas Chromatograph, Dionex ICS-2000 RFIC Ion Chromatography system, Thermo Scientific System P1000 HPLC with a Thermo Scientific Spectra System UV 1000; Jasco PU-1580 intelligent HPLC pump with LG-1580-02 Ternary gradient unit, with a Waters 486 Tuneable Absorbance Detector. The XRD was an Inel Equinox 2000 powder diffractometer. Our light sources for the photocatalysis were three Memlux ETU-MSS20W/B22 Cool daylight energy saving bulbs, these were arranged in a triangular configuration around a magnetic stirrer hotplate and enclosed in aluminium foil for maximum light containment.

The photoreactor used comprised of three Memlux ETU-MSS20W/B22 Cool daylight, energy saving bulbs. These were arranged in a triangular configuration around a hotplate/stirrer and then enclosed as much as was practical with ordinary domestic aluminium foil.

Example 1—Preparation of Pre-Exchanged Clay

The Fulacolor™ acid activated clay was used as supplied.

The Wyoming bentonite was purified via a sedimentation technique. The clay mineral (25 g) was suspended in sodium chloride solution (~2.5 l, 1M) and stirred vigorously to ensure dispersion. The suspension was then allowed to settle for 7.5 hours, which according to Stoke's law[2],[3], would give us the purified clay as the <2 μm colloidal faction that was required for further work in the top 10 cm of suspension. The top 10 cm was then siphoned off and collected. The suspension was made up to the original 10 cm mark with deionised water and the clay re-suspended and the settling, collection cycle repeated each day until the upper liquid part remained almost clear after the settling period. The combined settled suspensions were allowed to settle fully and as much of the clear liquid was poured off from the solid which was transferred to a centrifuge vessel and centrifugation continued until the liquid was clear. After pouring off the liquid from the solid, the solid was washed with fresh water and re-centrifuged until free from chloride ions ($AgNO_3$). The washed solid was then transferred to a clock glass and dried for 2-3 days before grinding to a powder in a pestle and mortar.

Example 2—Ion-Exchange to Install "Pre-Active Metal Species" within the Clay A cation exchange process was performed as follows: a solution of iron(III) nitrate or iron(III) chloride (0.3M, 250 ml) was added to the clay (25 g) prepared in Example 1. This was stirred vigorously at 70° C. for one hour; the recovered catalyst was then washed thoroughly with water under vacuum filtration. The catalyst was then dried overnight at 60° C. and subsequently ground to a fine powder.

Example 3—Transformation of Post-Exchanged Clay to Form Nanocomposites

The post-exchanged clay produced in Example 2 was heated constantly in a sealed glass bottle at 130° C. for up to a period of 30 days to produce a water-purifying composite material.

Example 4—Synthesis of Clay Mineral/Iron(III) Oxide Nanocomposites for Characterisation The clays to be utilised for characterisation of the nanoparticulate iron(III) species with time were cation exchanged as described above in Example 2. However, during the final heating step, samples were withdrawn at 5 days, 15 days and lastly at 30 days for comparison as catalysts.

Fresh iron(III) nitrate and iron(III) chloride exchanged Fulacolor™ based nanocomposites were prepared along with iron(III) nitrate, iron(III) sulphate and iron(III) chloride exchanged raw Wyoming bentonite clay/iron(III) oxide nanocomposites. The catalytic capability of the catalysts were then investigated; the reactions being followed by GC-MS at first and then by hplc and Dionex ion chromatography later.

The level of immobilization of the iron oxide nanocomposites within the clay was assessed by extraction of simple aquated iron cations with molar potassium chloride solution—which decreases rapidly over 10-25 days; followed by extraction with 0.1M hydrochloric acid. The iron cation extraction decreases after 20-40 days showing complete iron oxide formation. The iron extraction is measured using various techniques including: ICPMS, thiocyanate complexation/uv-visible spectrophotometry, ion chromatography, etc. Previous workers in our laboratory had shown that the 30 day period was optimum for formation of the nanocrystalline iron(III) oxides or oxyhydroxides as, prior to that time, most of the hexaaquairon(III) cations could be extracted out of the clay, initially by excess potassium chloride solution (1M) and subsequently only with 0.1M hydrochloric acid. After 30 days, very little iron(III) could be extracted even by hydrochloric acid, suggesting that the iron(III) cations had passed from hexaaquairon(III), through the ferrihydrite stage and had formed (meta)stable iron(III) oxyhydroxides (either goethite from nitrate or akaganeite from chloride salts).

The pale colour of these clays after heat treatment suggests that the iron(III) exists as nanoparticles within the clay interlayer as iron(III) oxides with c axes constrained to ca. 10 Å by the clay layers, are expected to be transparent to visible light.[4],[5]

X-ray diffraction analysis, using the instrument available at Durham University, was performed to try to identify the species of iron(III) oxide grown within the clay mineral. As a consequence of the nanometer size of the particles, broadening of the characteristic x-ray peaks occurred until they were lost in the noise of the baseline (the Scherer equation shows that the width at half height of a peak increases as particle size decreases).[6],[7] However, it is reasonable to presume that identification of the iron(III) oxide species could be effected by using high intensity synchrotron radiation, which is more sensitive.

Example 5—Thermal Catalysed Oxidation of Phenol with Hydrogen Peroxide

The work began by investigating the room temperature oxidation ability of three three-year old (iron(III) nitrate, iron(III) sulphate and iron(III) chloride) nanocomposites formed with Fulacolor™ clay. The initial phenol concentration (0.1M), reaction volume (20 ml) and mass of catalyst (50 mg) used were the same as developed during the previous projects, however; the amount and rate of addition of hydrogen peroxide was varied. Reaction was carried out by adding a portion, typically 300 µl, of hydrogen peroxide (30%) with magnetic stirring for up to 3 days. Small portions (ca. 1 cm$^3$) were removed at 15 to 20 minute intervals, the clay removed by filtration through a small wad of tissue in a Pasteur pipette and analysed. A plot of concentration of reactant and identified products was constructed to compare the rates with each catalyst.

Example 6—Photocatalysed Oxidation of Phenol with Hydrogen Peroxide

For the photocatalytic oxidation of phenol, slight changes to the system were made from Example 5. The activated clay catalyst (0.1 g per 40 ml of solution) was dispersed in aqueous phenol solution (0.017M, 20 ml, 40 ml or 80 ml depending on the frequency of sampling) in a stoppered Pyrex test tube by stirring. The reaction vessel was placed in close proximity to the 3 light source (7-10 cm); the analysis being by both HPLC and also Ion Chromatography. The solutions of aqueous para-nitrophenol and 4-chloro-3-methylphenol were at the same concentration as the phenol (0.017M).

Figure 1:
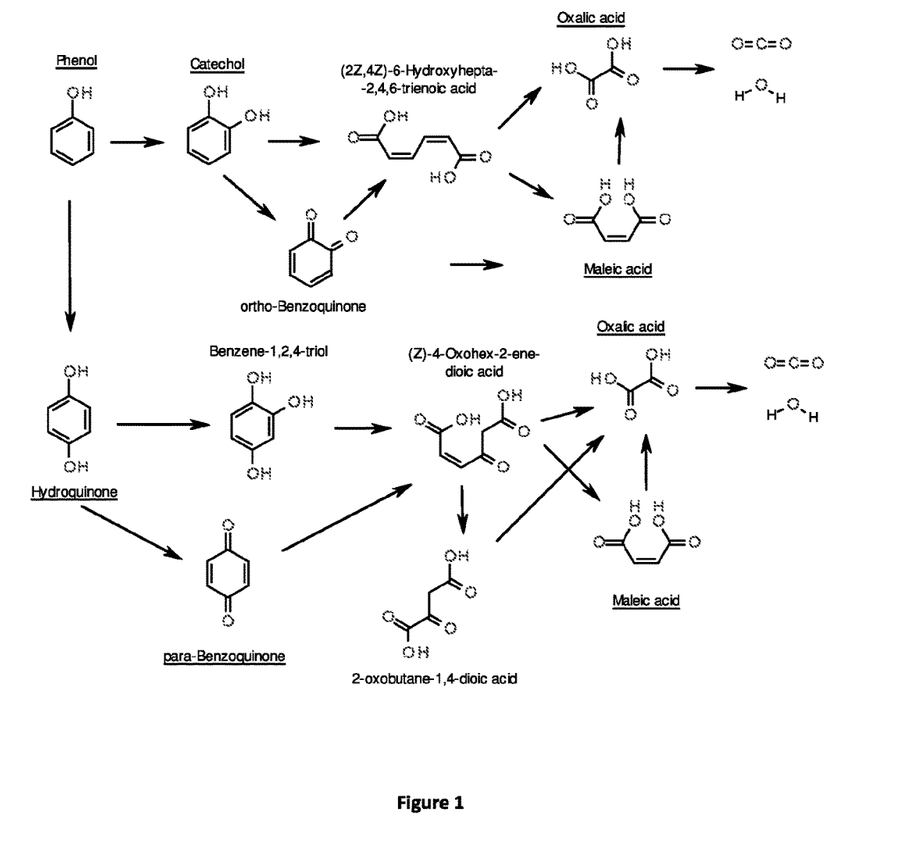
FIG. 1 shows the suggested degradation pathway of phenol to carbon dioxide and water. The species underlined are those that have been identified to date as products that accumulate during the reaction, including phenol, catechol, hydroquinone, para-benzoquinone, oxalic acid, and maleic acid.

The products identified during the degradation of phenol using the above method are shown in FIG. 1 (underlined species were identified through HPLC and Ion Chromatography).

FIG. 1 shows the suggested degradation pathway of phenol to carbon dioxide and water. The species underlined are those that have been identified to date as products that accumulate during the reaction. These species include phenol, catechol, hydroquinone, para-benzoquinone, oxalic acid, and maleic acid.

Further analytical experiments were performed based on the above procedure.

A suitable photoreactor was assembled in a fume cupboard and enclosed within aluminium foil for maximum light flux. The quantities and conditions described above were maintained for the initial investigation and we chose a freshly prepared iron(III) nitrate activated Fulacolor™ as the catalyst as it had given us faster rates in the non-photocatalysed experiments. The reactions proceeded many times faster under visible light irradiation; supplied by the daylight simulating bulbs. We chose to refine our system further, to give increased light flux through the Pyrex reaction vessel. To this end we used 15×2.5 cm Quickfit Pyrex boiling tubes to allow efficient penetration of light through the reaction mixtures and also to filter out low wavelength UV light. The data obtained proved the photocatalytic capability of the catalyst: with this experiment two similar reactions with standard ratios of phenol to iron(III) nitrate activated catalyst were prepared and all of the hydrogen peroxide was added at the start of the experiment; then further oxidant after 17.5 hours. The first reaction was kept completely in the dark, while the other was placed in the photoreactor. Both reactions were left overnight before sampling as they showed varying induction times; then they were monitored throughout the next day. The reaction proceeded much faster under irradiation as is shown in FIG. 2.

Figure 2:
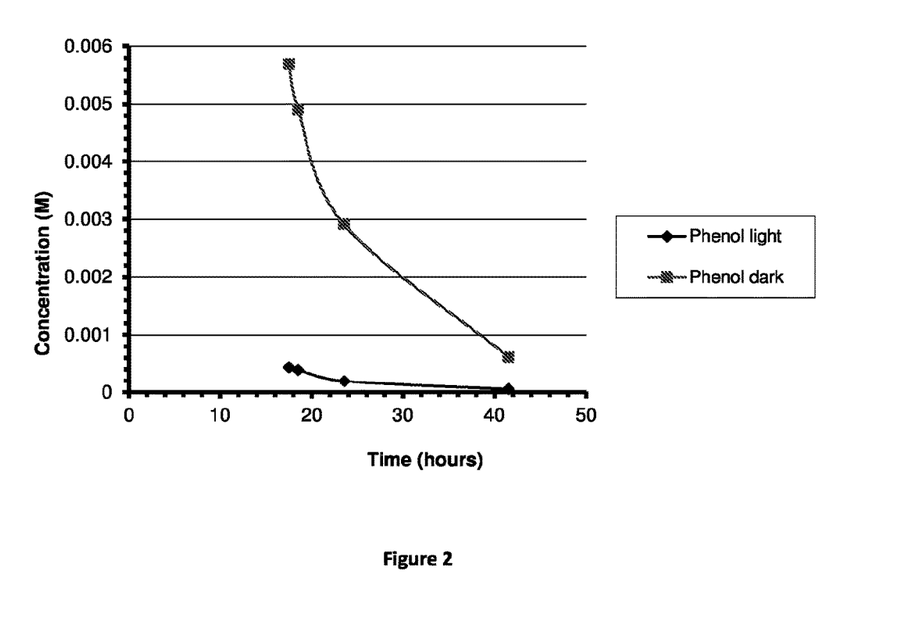
FIG. 2 shows a graphical comparison of phenol degradation with (diamonds) and without (squares) light.
Figure 3:
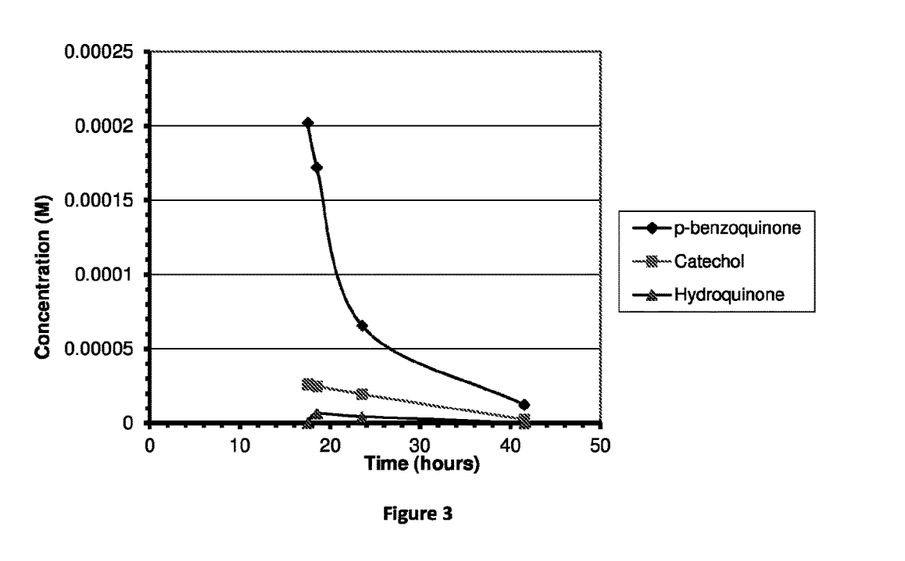
Figure 4:
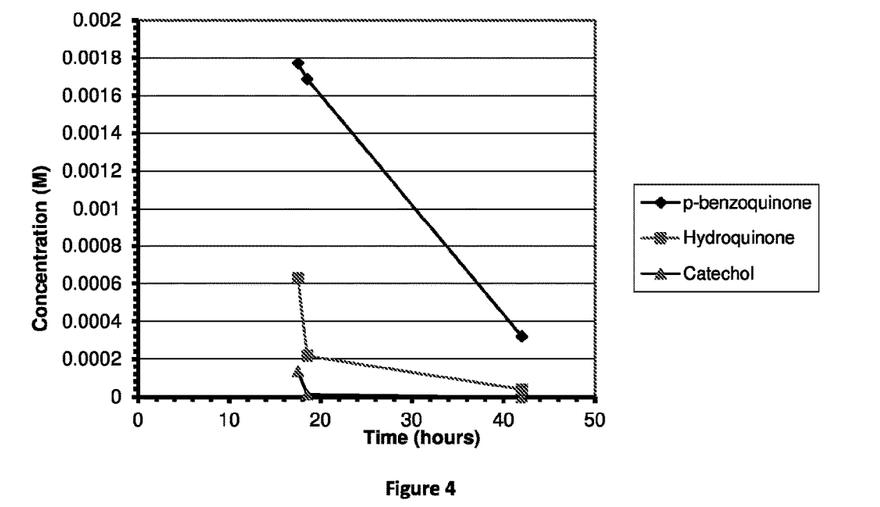

FIG. 2 shows a graphical comparison of phenol degradation with and without light FIGS. 3 and 4 show clearly that the energy saving daylight simulating bulbs have increased the rate of destruction of phenol and its degradation products considerably, we can see that the photocatalytic destruction of phenol has proceeded almost to completion as the dark reaction has just been initiated.

FIG. 3 shows phenol degradation in light
FIG. 4 shows phenol degradation in the dark Example 7—Magnetite Nanocomposites and their Use Mixed Fe(III)/Fe(II) Fulacolor™ nanocomposite (magnetite) were synthesized as follows. Cation exchange clay minerals that have been exchanged with a 3-10 fold excess of both iron(II) and iron(III) cations, preferentially in a molar proportion of approximately 1×iron(III) to 1.5-2×iron (II), for highest activity, depending upon the aluminosilicate preference for adsorption of 3+ versus 2+ cations of the size used. The washed, dried and ground Fe2+/Fe3+ clay mineral was heated in a closed heat resistant vessel for up to about 35 days at 110 to 130° C. until the iron oxide is formed completely, as discerned by the leaching assessments described herein.

Figure 5:
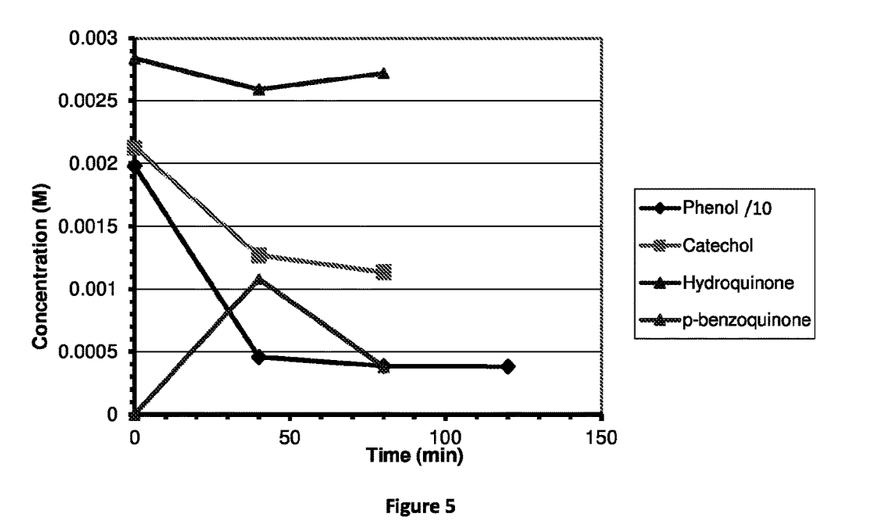

FIG. 5 shows phenol degradation with magnetite Fulacolor™ nanocomposite treated with stoichiometric hydrogen peroxide.

With this catalyst we observed that hydroquinone built up to the highest concentration; which is very different from the Fe(III) nitrate activated variants. The likely reasons for this are three fold: firstly, the catalyst surface will be less polar than the surface of the other clay catalysts due to the presence of Fe(II), thus the phenol will not be bound as strongly to the surface and not bring the ortho-position into close proximity to the surface bound hydroxyl radicals; secondly, the Fe(II) in the magnetite should show high thermal activity for the Fenton process and thirdly, the band gap (~5.07 eV) of magnetite may be of sufficiently high energy to carry out oxidation of the phenol in its own right.

Conclusions as to the Best Reaction Conditions for Phenol Degradation

Several different clay mineral metal oxide clay nanocomposites have been developed that are effective in degrading phenol via hydroquinone, catechol, para-benzoquinone, maleic acid and oxalic acid to carbon dioxide and water. The metal oxide/clay mineral nanocomposites described herein have proven to be cheap, green, highly effective, daylight photocatalysts, capable of mineralising phenols rapidly, under aqueous conditions, employing hydrogen peroxide as oxidant in Fenton or photo-Fenton processes. Complete degradation of phenol requires several days under thermal (Fenton) conditions, but only a few hours on irradiation with visible light (photo-Fenton). On absorption of light by semi-conductors such as iron(III) oxides, electrons in the valence band of the iron(III) oxide are photoexcited to the conduction band, leaving positive "holes" in the valence band. The electrons in the conduction band can migrate rapidly to the particle surface, where they can act as reducing agents; whilst the positive holes take a much longer time migrating to the surface, before they can be used to oxidise susceptible molecules, such as phenols.

When the iron(III) oxides are supported on acid activated clay minerals such as Fulacolor™, a lag period is experienced before phenol degradation occurs, whereas no lag period is observed with intact clay mineral supports, such as Wyoming bentonite, The observed lag period may be due to the co-existence of silica mesopores along with residual montmorillonite structure in the acid activated clay mineral. Larger iron(III) oxide crystals, forming in the mesopores, will require a period of time for migration of positive "holes" to the particle surface before oxidation can be effected. The nano-sized crystals that will form between intact montmorillonite layers will give much faster "hole" migration and so there is no apparent lag time before oxidative degradation begins.

The iron(III) oxide species has an effect on the rate of reaction. The most stable iron(III) oxide, haematite, will be formed as the final aging product from other iron(III) oxides or oxyhydroxides. Thus a 3+ year old sample of Fulacolor™ iron(III) oxide nanocomposite, whose deep red colour suggests the presence of haematite, was far less active than freshly prepared Fulacolor™ nanocomposites that contain, what should be, goethite (from iron(III) nitrate) or akaganéite (from iron(III) chloride). Mixed iron(II)/iron(III) oxide (magnetite) clay mineral nanocomposites are more active catalysts, apparently due to the presence of a large number of iron(II) cations from the beginning of the reaction, iron(II) is necessary for the Fenton reaction, rather than having to generate iron(II) from iron(III) cations via thermal or photochemical electrons formed within the iron(III) oxide semi-conductors.

Further substitution on the phenol ring appears to accelerate the rate of decomposition, but an insufficient variety of substituents have been examined, as yet, to allow any firm conclusions to be made as to why this happens.

Collating the results obtained in the phenol degradation experiments, it appears that the catalyst will perform best under the following conditions: narrow reaction vessel to maximise light flux, stoichiometric ratio of oxidant to phenol and prior dispersion of catalyst over a period of several hours. For mineralisation purposes the bentonite clay catalyst seems to show the greatest promise. Magnetite clay nanocomposites that have Fe(II) already in the structures appear to promote thermal Fenton processes as well as the photo-Fenton reaction.

The inventors have thus discovered that natural clay materials, such as montmorillonites can be used as supports for heterogeneous catalysts for the destruction of phenols through photo catalytic processes, releasing carbon dioxide and water. These clays may be used in the presence of an environmentally benign oxidants such as hydrogen peroxide and they require light to enhance the photodecomposition process; preferably in the visible region. The methods of the invention provide a non-polluting, efficient, cheap and sustainable method for water treatment using clay nanocomposites (optionally containing iron(II) as well as iron(III)), visible light and hydrogen peroxide as co-oxidant. However, recent experiments also suggest that oxygen itself serves as a co-oxidant and could replace hydrogen peroxide entirely.

REFERENCES

[1] Schwertmann, U. and Cornell, R. M.; "The Iron Oxides—structure, properties, reactions, occurrences and uses, VCH, Cambridge 1996.

[2] Batchelor, G. K.; "An Introduction to Fluid Dynamics", Cambridge University Press, (1967).
[3] Lamb, H. "Hydrodynamics", (6$^{th}$ed.), Cambridge University Press, (1994).
[4] Cornell, R. M. and Schwermann, U.; "The Iron Oxides". VCH Weinheim, New York.
[5] Bandara, J., Mielczarski, J. A. and Kiwi, J.; *Langmuir*, 15, 7680, (1999).
[6] Scherrer, P.; Gottinger Nachrichten gesel., 2, (1918).
[7] Patterson, N.; "The Scherrer formula for X-ray particle size determination." *Phys. Rev.*, 56, (10), 978-979, (1939).

What is claimed is:

1. A method of preparing a water-purifying composite material, the method comprising:
    (i) providing a pre-transformed composite material comprising a mineral material incorporating non-crystalline pre-active metal cations within ion exchangeable sites within interlayer regions and/or pores of the mineral; wherein:
    the mineral material is selected from the group consisting of an aluminosilicate mineral material, a magnesiosilicate mineral material, a ferrosilicate mineral material, and combinations thereof; and
    wherein the non-crystalline pre-active metal comprises iron(III) and/or iron (II) cations which
    saturate at least 70% of ion-exchange sites within the mineral material;
    (ii) transforming the pre-active metal cations into a nanocrystalline photocatalytic metal compound immobilized within the mineral material;
    wherein the photocatalytic metal compound resides within interlayer regions and/or pores of the aluminosilicate mineral material, comprises iron species, is not a haematite and absorbs electromagnetic radiation within the visible spectrum and wherein the photocatalytic metal compound is photocatalytic in that it is capable of generating hydroxyl radicals in the presence of peroxides and electromagnetic radiation within the visible spectrum.

2. The method as claimed in claim 1, wherein the mineral material is an aluminosilicate mineral material.

3. The method as claimed in claim 2, wherein the photocatalytic metal compound is a semiconductor providing a valence band and conduction band for electrons.

4. The method as claimed in claim 2, wherein the photocatalytic metal compound is a semiconductor which provides a valence band and a conduction band between which electronic transitions can be induced through irradiation with visible light.

5. The method as claimed in claim 2, wherein the photocatalytic metal compound comprises metal oxides.

6. The method as claimed in claim 5, wherein the photocatalytic metal compound comprises at least some metal oxyhydroxides.

7. The method as claimed in claim 2, wherein the photocatalytic metal compound comprises both iron (III) species and iron (II) species.

8. The method as claimed in claim 2, wherein the photocatalytic metal compound is a form of magnetite.

9. The method as claimed in claim 2, wherein the pre-active metal cations saturate ion-exchange sites within the aluminosilicate mineral material.

10. The method as claimed in claim 2, wherein the aluminosilicate mineral material is a clay mineral or a zeolite.

11. The method as claimed in claim 10, wherein the aluminosilicate mineral material is a clay mineral.

12. The method as claimed in claim 11, wherein the clay mineral is a montmorillonite clay.

13. The method as claimed in claim 2, wherein the aluminosilicate mineral material is a non-acid activated clay.

* * * * *